(12) United States Patent
DiMaiolo et al.

(10) Patent No.: US 10,589,220 B1
(45) Date of Patent: Mar. 17, 2020

(54) PRESSURE SWING ADSORBTION AIR DRYER

(71) Applicant: Altec Industries, Inc., Birmingham, AL (US)

(72) Inventors: James Vincent DiMaiolo, Lafayette, CO (US); David K. Boger, Sonoma, CA (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/263,514

(22) Filed: Jan. 31, 2019

(51) Int. Cl.
*B01D 53/26* (2006.01)
*B01D 53/047* (2006.01)

(52) U.S. Cl.
CPC ......... *B01D 53/261* (2013.01); *B01D 53/047* (2013.01); *B01D 2257/80* (2013.01); *B01D 2259/402* (2013.01); *B01D 2259/40007* (2013.01); *B01D 2259/40043* (2013.01)

(58) Field of Classification Search
CPC .............. B01D 53/261; B01D 53/047; B01D 2259/40007; B01D 2259/40043; B01D 2257/80; B01D 2259/402
See application file for complete search history.

(56) References Cited

U.S. PATENT DOCUMENTS

| | | | | |
|---|---|---|---|---|
| 4,552,570 A | * | 11/1985 | Gravatt | B01D 53/0407 95/10 |
| 6,375,722 B1 | * | 4/2002 | Henderson | B01D 53/0454 96/112 |
| 6,772,534 B2 | * | 8/2004 | Gomes | F24F 3/1411 34/210 |

OTHER PUBLICATIONS

Air Dryers; PUREGAS, LLC; Date Printed: Jan. 31, 2019; Date Posted: Unknown; <http://www.airdryers.com/air-dryers/>.

\* cited by examiner

*Primary Examiner* — Jessica Yuen
(74) *Attorney, Agent, or Firm* — Erise IP, P.A.

(57) ABSTRACT

A pressure swing adsorption air dryer system and method is described herein. In some embodiments, the air dryer system receives moist air and dries the air using a desiccant in a pressure swing adsorption method. The resulting dry air may be used as a working fluid for an application and a portion of the dry air may be used to aid in regenerating, or removing moisture from a desiccant. Sensors are strategically placed throughout the air drying system to measure the state of the air. The air and airflow may be controlled throughout the system based on the sensor measurements.

20 Claims, 3 Drawing Sheets

PRESSURE SWING ADSORBTION AIR DRYER

BACKGROUND

1. Field

Embodiments of the invention are directed to heatless air dryers. More specifically, embodiments of the invention are directed to controlling airflow from an active tower to a regenerative tower of an air dryer.

2. Related Art

Moisture is typically removed from compressed air using an air dryer. When air is compressed and cooled past the dewpoint the water vapor in the air condenses and is released as moisture. The liquid water can cause problems in mechanical, pneumatic, electrical systems, or any other system that has moving parts or elements that may be corrosive or rust. For example, moisture can cause damage to moving parts and can cause malfunction of pneumatic controls resulting in costly shutdown or damage. In cold weather, moisture in pneumatic lines may freeze, reducing efficiency or even causing damage to lines, valves, or any other operational parts. Moisture may also wash out oil in moving parts resulting in rust, quickened wear, and damage.

Standard heatless air dryers, or pressure-swing-adsorption (PSA) air dryers, comprise two towers containing a desiccant or other adsorbent material. The air dryers receive compressed air with moisture and run the air through an active tower and remove the moisture from the air by adsorption into the desiccant. The dry air then exits the active tower and is supplied as the working fluid. In some air dryer systems, a portion of the dry air is supplied to a regenerating tower to quicken the process of drying the desiccant in the regenerating tower.

Typical air dryers are sized based on an inlet pressure and an inlet or outlet flowrate. Further, air dryer size is broken down into two main parts: the volume/size of the desiccant tower and the size of the purge orifice to regenerate the offline tower. Typical air dryers are also manufactured with standard purge orifice sizes based on published performance or are custom sized to specific pressure and flow combinations. Orifices are either drilled in production or ordered from a precision orifice manufacturer. These orifices must be custom designed and made which can be expensive and time consuming.

Many different systems must be designed for specific uses such as telecommunication transmission line, manufacturing equipment, pneumatic tools, HVAC controls, laboratories, and electronics such as 3D printers, computers, or any other process or system that requires clean dry air. These applications require clean dry air and air dryers specifically designed for each application. Embodiments of the invention solve these problems by providing an air dryer system that uses strategically placed sensors to determine the quality and state of the air and airflow and control the airflow that allows an air dryer to be programmed to each one of the possible applications without having to redesign the towers and the orifice supplying the clean dry air.

What is needed is a heatless air dryer designed for variable inlet pressure and inlet or outlet flow to optimize the purge flow based on sensor measurements throughout the system. This results in cost and energy savings for both the client and the manufacturer. Embodiments of the invention comprise a PSA air dryer utilizing a mass flow controller that controls the purge airflow based at least in part on mass flow rate, dewpoint, and pressure. Based on various measurable parameters such as inlet (or outlet) flow, pressure, and regenerating tower dewpoint, the mass flow controller may adjust the appropriate purge flow to provide the desired outlet conditions to the user and for regeneration of the regenerating desiccant tower. Utilizing these additional sensors and features including the controller will create a dryer system for a broader range of applications which will be more efficient and provide custom outlet conditions as desired.

SUMMARY

Embodiments of the invention solve the above-mentioned problems by providing a variable flow of dry air from an active tower to the regenerating tower. A first embodiment of the invention is directed to a pressure swing adsorption system of drying air comprising a first tower containing a first desiccant and receiving an incoming airflow, wherein the first desiccant adsorbs moisture from the incoming airflow creating a reduced-moisture air, a second tower containing a second desiccant and receiving the reduced-moisture air from the first tower, a valve for regulating an amount of the reduced-moisture air flowing from the first tower to the second tower, and at least one sensor for measuring a state of the air in the system, wherein the valve is configured to be controlled based on the measured state of the air.

A second embodiment is directed to a pressure swing adsorption method of drying air, comprising the steps of receiving incoming air through an inlet valve, passing the incoming air through a first desiccant disposed in a first tower, wherein the desiccant removes moisture from the incoming air creating dry air, passing a first portion of the dry air to an outlet of the system to be used as a working fluid, passing a second portion of the dry air to a second desiccant in a second tower through a variable orifice purge valve, wherein the variable orifice of the purge valve is controlled by a controller, wherein the dry air removes moisture from the second desiccant creating wet air, and removing the wet air from the system through a purge valve.

A third embodiment is directed to a pressure swing adsorption system of drying air comprising a first tower containing a first desiccant and receiving an airflow, a second tower containing a second desiccant, wherein the first desiccant is configured to adsorb moisture from the airflow creating a reduced-moisture air, at least one sensor for sensing a state of the air in the system, and a valve for regulating the reduced-moisture air from the first tower to the second tower, wherein the second tower receives at least a portion of the reduced-moisture air for regenerating the second desiccant.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1A:
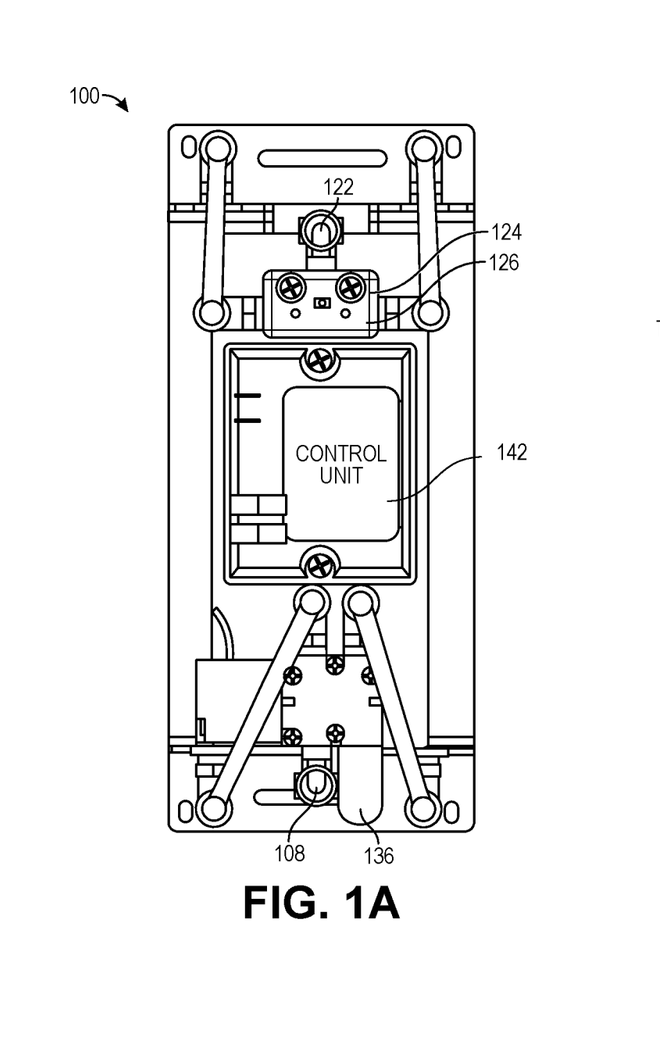
FIG. 1A depicts an embodiment of a pressure swing adsorption system for drying air.
Figure 1B:
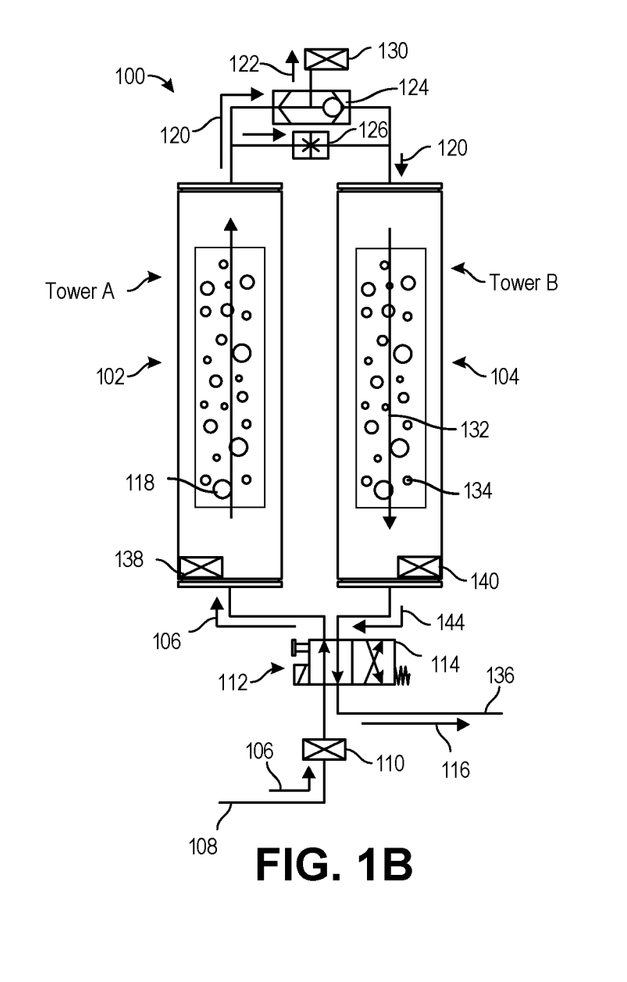
FIG. 1B depicts a schematic of the pressure swing adsorption system of FIG. 1A.

A general description of the system depicted in FIGS. 1A and 1B will be discussed first. A more detailed description is presented below. FIGS. 1A and 1B present an embodiment of an air drying system 100 utilizing pressure swing adsorption for drying air. Pressure swing adsorption is a technique for drying air utilizing the tendency for certain desiccants to hold different amounts of moisture at different pressures. Particularly, when a desiccant is under relatively high pressure the desiccant can adsorb and hold more moisture than at a lower pressure. Thus, compressed air containing moisture can pass through a desiccant and the moisture is adsorbed into the desiccant. When the pressure is then abruptly reduced, the moisture may then desorb from the desiccant in effect recharging or regenerating the desiccant to a state for adsorption once again. To quicken the process, dry air may be added to the now lower pressure vessel from the higher pressure vessel to gain more moisture and purge the vessel containing the regenerating desiccant of any remaining moisture from the previous adsorption cycle.

FIG. 1A depicts an embodiment of the air drying system 100 and FIG. 1B depicts a schematic of the air drying system 100 presenting a Tower A in embodiments is the active tower 102. Tower B in some instances is the regenerating tower 104. In some embodiments, for clarity, Tower A is referred to as the active tower 102 and in some embodiments, tower B is referred to as the regenerating tower 104. In some embodiments, since the process of drying the air is cyclical, Tower A may be regenerating and Tower B may be actively drying or the active tower 102. However, unless otherwise noted it should be assumed that Tower A is active and Tower B is regenerating. The active tower 102 is the tower that is actively removing moisture from, or drying, the air. The regenerating tower 104 is the tower that is regenerating the desiccant.

The cycle between Tower A and Tower B may occur at time intervals or when measurements from sensors indicate that the active desiccant has adsorbed an amount of moisture or the air in the active tower has reached a threshold humidity or dewpoint. Similarly, the cycle may be initiated when measurements in the regenerating tower 104 indicate that the air within the regenerating tower has reached specific levels or thresholds. For example, the air in the regenerating tower may be measured and the dewpoint or humidity may be tracked. When the humidity reaches a low enough value such that no more moisture is desorbed from the desiccant the cycle may switch, or turn off the purge airflow 120 from the active tower 102. These measurements may be taken continuously and each cycle may occur, for example, every two to five minutes.

The active tower 102 dries the incoming air 106 received at the receiving inlet 108. The incoming air 106 received through the receiving inlet 108 initially passes through the inlet sensors 110 that, in some embodiments, measures the state of the incoming air such as flow rate, temperature, and pressure. The incoming air then enters an inlet valve system 112, in some embodiments, a four way two position inlet/purge valve 114, for example. The inlet/purge valve 114 controls the airflow into the active tower 102 and the exhaust purge air 116 from the regenerating tower 104.

Next the incoming air 106 passes into the active tower 102. The active tower 102 removes moisture from the incoming air 106 by passing the air over an active desiccant 118 contained in the active tower 102. Once the incoming air 106 is dry, the dry air 120 leaves the active tower 102 and is passed to either be used as a working fluid 122 through a shuttle valve 124, or supplied to the regenerating tower 104 through the adjustable purge mass flow controller 126. The control unit 142 may control the flow rate through the adjustable purge mass flow controller 126 to pass a portion of the dry air 120 to the regenerating tower 104. An adjustable purge mass flow controller 126 may comprise a valve and any electrical and or mechanical actuators for passing the dry air 120 to the regenerating tower 104. A control sensor 130 may be used to measure the state of the dry air 120. Once the dry air 120 passes to the regenerating tower 104, the dry air 120 is circulated through the regenerating desiccant 132 to quicken the drying process. Moisture is removed from the regenerating desiccant 132 into the regenerating air 134 and released through the inlet/purge valve 114 to a purge outlet 136.

Once the regenerating desiccant 132 in the regeneration tower 104 is dry and the active desiccant 118 in the active tower 102 has adsorbed a designated amount of moisture, typically based on a timer, the shuttle valve 124 and the inlet/purge valve 114 switch making Tower A the regeneration tower 104 and Tower B the active tower 102.

The switching time may be optimized by measuring the air at different stages in the process. For example, the state of air may be measured at the inlet sensor 110, the control sensor 130, and additionally in the active tower 102 at active tower sensor 138 and regenerating air sensor 140. The sensors may measure pressure, temperature, humidity, and any other air state that may be useful for controlling airflow and air state. For example, pressure, humidity, and temperature in the towers may be measured to determine the dewpoint and control the mass flow rate through the adjustable purge mass flow controller 126. This process allows the air drying system 100 to be programmed for the particular application whether it be in manufacturing, bacteria reduction for dental purposes, or pressurized telecommunication cables. The air drying system 100 can provide the air outlet conditions and working fluid conditions required by the application such that air dryer system 100 does not need to be designed for each specific custom applications as described above.

The air drying process may be implemented by at least one processor in a control unit 142. The control unit 142 may control any aspect of the drying system 100 such as, for example, the flow through the adjustable purge mass flow controller 126, or opening and closing and/or switching of the inlet/purge valve 114, shuttle valve 124, any heating element that may be used to control air temperature at any point in the drying system 100, any valve or valves that may be used to control the air through the air drying system 100, any pressure inducing devices such as fans or tools, or any other device that may be attached to the drying system 100. The control that is used may be a programmable logic, proportional, derivative, integral, lead, lag, compensation, or any combination thereof.

A more detailed description of embodiments of the invention are now discussed. Continuing with the exemplary embodiment depicted in FIGS. 1A and 1B, an air drying system 100 comprising the active tower 102 and the regenerating tower 104 providing dry air to be used for any of the above described applications. Air, typically compressed air, flows into the air drying system 100 through inlet 108 which as seen in FIG. 1A, when opened, allows incoming air 106 to flow into the air drying system 100. The inlet 108 may be any type of connection for connecting to an air compressor any such tool or device. In some embodiments, the inlet 108 may be couplers for coupling to an air compressor and in some embodiments, the inlet 108 may be a system of hoses, tubes, pipes and valves supplying air to the air drying system 100.

The airflow then passes through inlet sensor 110. The inlet sensor 110 may measure mass flow rate, temperature, pressure, or any other useful states of the incoming air 106. In some embodiments, the inlet sensor 110 measures mass flow rate and pressure. In some embodiments, there is no inlet sensor 110 and the incoming air 106 flows directly to the inlet/purge valve 114. In some embodiments, the inlet sensor 106 is positioned on the tower side of the inlet/purge valve 114, and the incoming air 106 flows through the inlet/purge valve 114 prior to measurement. A second inlet sensor may be attached at the purge exhaust 136 since in the cyclical phase Tower B is the active tower. Further, the inlet sensor 110 may also measure the state of the purge air 116 at the purge exhaust 136 and relay that information to the control unit 142 to further control the air flow in the air drying system 100.

The incoming air 106 then passes to the inlet/purge valve 114. The inlet/purge valve 114, in some embodiments, may be a four-way two position valve. The inlet/purge valve 114 allows the incoming air 106 to pass into the active tower 102 while also allowing purge air 116 to exit the air drying system 100 at the purge exhaust 136. The inlet/purge valve 114 may be attached to both the active tower 102 and the regenerating tower 104 for directing air in and directing air out.

The function of the inlet/purge valve 114 may change depending on which tower is active and which tower is regenerating. The inlet/purge valve 114 may direct the incoming air 106 to either tower based on which tower is active or regenerative. Further, the inlet/purge valve 114 may direct the airflow out of the tower that is regenerating. The flow out of the regenerative tower 104 may be passed through a pressure valve located on the inlet/purge valve 114. This may release built up pressure and maintain the pressure within the regenerative tower 104 at an optimal pressure for regenerating the regenerating desiccant 132.

After passing through the inlet/purge valve 114 the incoming air 106 passes into the active tower 102. The active tower 102 is configured for drying the incoming air 106. The active tower 102 may contain the active desiccant 118. The active desiccant 118 actively removes the moisture from the incoming air 106.

In some embodiments, the incoming air 106 that enters the active tower 102 may be compressed air and therefore may contain moisture. Compressed air contains liquid water since the compressed air is at a higher pressure than atmospheric conditions. As the air pressure rises the dewpoint rises to higher temperatures. When the dewpoint reaches the temperature of the air temperature then condensation occurs transforming water vapor from the compressed incoming air 106 into liquid water.

The incoming air 106 that enters the active tower 102 under the conditions described above contains moisture. The moisture should be removed before the incoming air 106 is supplied to any operational parts for the reasons described above. Further, if the air entering the air dryer system 100 contains liquid water, the liquid water should be removed with a water separator prior to the air entering the air dryer system 100. The active tower 102 contains the active desiccant 118 to remove the moisture form the incoming air 106. In some embodiments, the active desiccant 118 that may be used to remove the moisture is silica gel, indicating silica gel, a molecular sieve, calcium oxide, calcium sulfate, or any other material that adsorbs moisture or any combinations thereof.

Once the moisture has been removed from the incoming air 106 by the active desiccant 118, the air is dry air 120 exiting the active tower 102. In some embodiments, the dry air 120 is passed out of the active tower 102 as working fluid 122, through shuttle valve 124 and is directed to a machine, tool, telecommunications cable, dental equipment, manufacturing facility, electrical equipment, or any other device or application that uses clean dry air 122. In some embodiments, the shuttle valve 124 is a two-way or four-way valve, or any other type valve that may be suitable for embodiments described herein. Further, the shuttle valve 124 may direct the dry air 120 from the Tower B in the portion of the cycle when Tower B is the active tower 102.

In some embodiments, the dry air 120 is passed through a filter (not shown) to remove any impurities such as, for example, pieces of active desiccant 118 before supplying the working fluid 122 for application. The working fluid 122 may be passed through any other devices such as heating or cooling elements and further may be supplied to a second air drying system that may further dry the dry air 120 before becoming working fluid 122.

In some embodiments, the shuttle valve 124, may be in parallel fluid communication with the adjustable purge mass flow controller 126. The adjustable purge mass flow controller 126 may be controlled using an actuator (not shown) and/or may be controlled with control unit 142. The adjustable purge mass flow controller 126 may be controlled to open or close to control the flow of dry air 120. The adjustable purge mass flow controller 126 may comprise an orifice that the dry air 120 flows through. The open area of the orifice may be controlled such that the amount of dry air 120 per time unit flowing through the adjustable purge mass flow controller 126 into the regenerating tower 104 is controlled.

The adjustable purge mass flow controller 126 may be used to control mass flow rate based on sensor output. The flow to the pneumatic tool or manufacturing device and the dry air 120 airflow to the regenerating tower 104 may be controlled to effectively control the drying rate of the regenerating desiccant 132 in the regenerating tower 104. In doing so, switching the active tower 102 can be performed at an optimal time when the active tower 102 is reaching a point where the active desiccant 118 loses the optimal ability to adsorb moisture and the regenerating desiccant 132 is thoroughly dry and ready to adsorb moisture and produce dry air 120.

The dewpoint in the regenerating tower 104 may control the time to dry for the air drying system 100. Controlling the amount of dry air 120 into the regenerating tower 104 controls the dewpoint and therefore the time to dry for the regenerating desiccant 132. This allows for the air dryer system 100 to be used for multiple purposes rather than being designed and optimized for a specific airflow, pressure, or drying time. The airflow is variable and the air dryer system can be optimized for multiple uses allowing one air drying system 100 to be programmed for different uses rather than customizing each air drying system 100 for a specific intended use. With the air drying system 100, presented in embodiments herein, the adjustable purge mass flow controller 126 just needs to be programmed for the intended use and the air drying system 100 may adapt to changing situations such as altitude or ambient air moisture, and not only be programmed such that a customized dryer need not be manufactured to maintain optimization through changing atmospheric conditions. This process allows the air drying system 100 the ability to be programmed for different uses and thus custom air drying systems do not need to be engineered or manufactured. This lowers the cost for manufacturers in engineering and production thus lowering the cost for these systems for the consumer.

The regenerating tower 104 may be designed the same or similar to the active tower 102. The regenerating tower 104 houses the regenerating desiccant 132 that has previously been used as the active desiccant 118. As the active tower 102 removes moisture from the incoming air 106, the regenerating tower 104 with regenerating desiccant 132 dries and recharges for another cycle as the active desiccant 118. While the active tower 102 is pressurized to create an environment conducive to removing the water from the incoming air 106, the regenerating tower 104 is depressurized reducing the pressure, typically, to atmospheric pressure for creating an environment conducive to remove moisture from the regenerating desiccant 132.

A portion of the dry air 120 provided from the active tower 102 and controlled by adjustable purge mass flow controller 126 may be introduced to the regenerating tower 104 to aid in drying and regenerating the regenerating desiccant 132. The reduced pressure allows the regenerating desiccant 132 to desorb and reduce any moisture in the regenerating tower 104 and, with the aid of the dry air 120, to be controlled. Controlling the dewpoint in the regenerating tower 104 controls the rate at which moisture is removed from the regenerating desiccant 132. This provides a method for controlling the drying process for multiple applications as described above. This process recharges the regenerating desiccant 132 such Tower B can be cycled back to being the active tower 102 to remove moisture from the incoming air 106.

In order to dry the regenerating desiccant 132, wet air 144 must be removed from the regenerating tower 104. As the dry air 120 is cycled through the regenerating tower 104 the dry air 120 is depressurized and takes moisture from the regenerating desiccant 132 becoming wet air 144. The wet air 144 is then expelled from the air drying system 100 through inlet valve system 112 which, in some embodiments, is inlet/purge valve 114. The wet air 144 is then expelled though purge outlet 136. The purge outlet 136 may be a pressure valve such that when the pressure in the regenerating tower 104 reaches a prescribed threshold the pressure valve opens releasing the wet air 144. In some embodiments, the inlet/purge valve 114 is controlled with an actuator in communication with the control unit 142 and programmed to release the wet air 144 at designated times or under different conditions as measured by any of the air drying system 100 sensors. In some embodiments, the inlet/purge valve 114 is a solenoid valve and is directly controlled from the control unit 142.

Figure 2A:
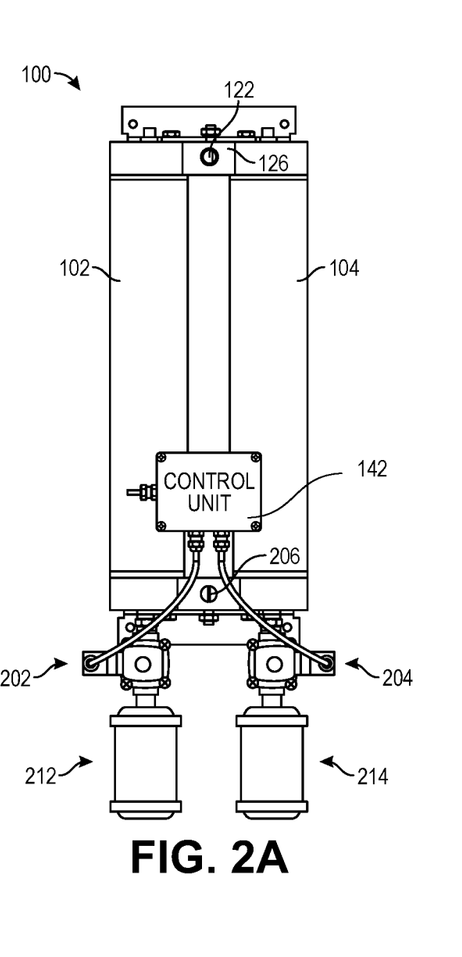
FIG. 2A depicts an embodiment of a pressure swing adsorption system for drying air.
Figure 2B:
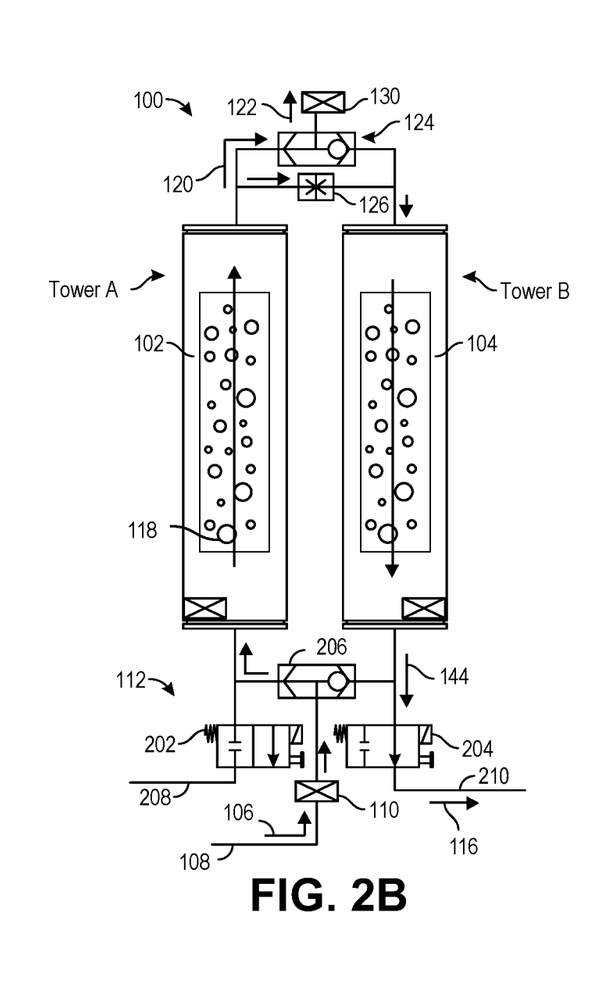
FIG. 2B depicts a schematic of the pressure swing adsorption system of FIG. 2A.

Turning now to an embodiment of an air drying system 100 depicted in FIGS. 2A and 2B, an alternative configuration featuring two two-way normally closed valves is presented. As in FIGS. 1A and 1B, FIG. 2A depicts an embodiment of a pressure-swing-adsorption air drying (PSA) system 100 and FIG. 2B depicts a schematic of an embodiment of the air drying system 100. In some embodiments, the air drying system 100 is the same as air drying system 100 in FIGS. 1A and 1B and can be used interchangeably. Many of the parts and processes are the same or similar and any parts and processes as described in embodiments herein may be added, omitted, or be used interchangeably between embodiments of the air drying system 100 described above and depicted in FIGS. 1A and 1B and embodiments of the air drying system 100 described below and depicted in FIGS. 2A and 2B.

In the embodiment depicted in FIGS. 2A and 2B, the inlet valve system 112 comprises three valves; a left valve 202, a right valve 204, and an inlet shuttle valve 206. As depicted, left valve 202 is closed and right valve 204 is open. This alternative inlet valve system 112 is the main difference between the embodiment depicted in FIGS. 1A and 1B and the embodiment depicted in FIGS. 2A and 2B.

In some embodiments, the incoming air 106 is received through inlet 108. The inlet may be couplers, pipes, tubes, or a system of valves, or the inlet 108 may be the direct outlet of an air compressor as described above. The inlet 108, in embodiments, is configured to receive moist air from an air source which may be a compressed air source.

In some embodiments, the left valve 202 and the right valve 204 are two-way valves. In some embodiments, the shuttle valve 206, the left valve 202, and the right valve 204 may be four-way valves, shuttle valves, check valves, solenoid valves, or any directional valves that may be used in embodiments of the invention.

In some embodiments, as depicted in FIGS. 2A and 2B, the incoming air may pass through the inlet sensor 110 and the state of the incoming air 106 may be measured and relayed to the control unit 142. The incoming air 106 may then pass to the shuttle valve 206. The shuttle valve 206 may be controlled to shift and direct the incoming air 106 to the active tower 102. The active tower 102 may be Tower A or Tower B based on the state of the air drying system 100 since the air drying process is cyclical and switches back and forth between towers. As depicted, Tower A is the active tower 102.

As depicted in FIG. 2B, the left valve 202 is closed. This allows the incoming air 106 to be directed to the active tower 102. When Tower A is the regenerating tower 104, the left valve 202 is open allowing purge air 116 from the regenerating tower to exit the air drying system 100 through the left purge exhaust 208. In some embodiments left muffler 212 and right muffler 214 are disposed on the left valve 202 and the right valve 204 respectively.

The incoming air 106 is then passed into the active tower 102. The active desiccant 118 in the active tower 102 removes the moisture from the incoming air 106 creating dry air 120 as described above. Similarly, the dry air 120 exits the active tower and is used as working fluid 122 while a portion of the dry air 120 may be directed to the regenerating tower 104 by adjustable purge mass flow controller 126. The adjustable purge mass flow controller 126 may be controlling the flow based on the measurements from the sensors as described above. In the regenerating tower 104, moisture is removed from the regenerating desiccant 132 by the dry air 120 thus creating wet air 144. The wet air 144 is expelled from the regenerating tower 104 as described in embodiments below.

As depicted in FIG. 2B, the right valve 204 is open. The wet air 144 expelled from the regenerating tower 104 is passed through the right valve 204 and expelled from the air drying system 100 through the right purge exhaust 210. The inlet shuttle valve 206 is closed on the side of the right valve 204 thus preventing wet air 144 from contaminating the incoming air 106.

In some embodiments, when the depicted cycle is complete the shuttle valve 206 changes and directs the incoming air 106 into Tower B as, upon switching cycles, Tower B becomes the active tower 102. Approximately simultaneously, the left valve 202 and the right valve 204 also switch, the left valve 202 opening to allow wet air 144 to exit from the regenerating tower 104 (Tower A) and the right valve 204 closes directing the incoming air 106 into active tower 102 (Tower B). In some embodiments, the left valve 202 and the right valve 204 are pressure valves and release upon the regenerating tower 104 reaching a pressure threshold. In some embodiments, the left valve 202 and the right valve 204 are controlled by actuators connected to the control unit 142. In some embodiments, the left valve 202 and the right valve 204 are solenoid valves and controlled directly by the electrical signal from the adjustable purge mass flow controller 126 and/or the control unit 142.

Figure 3:
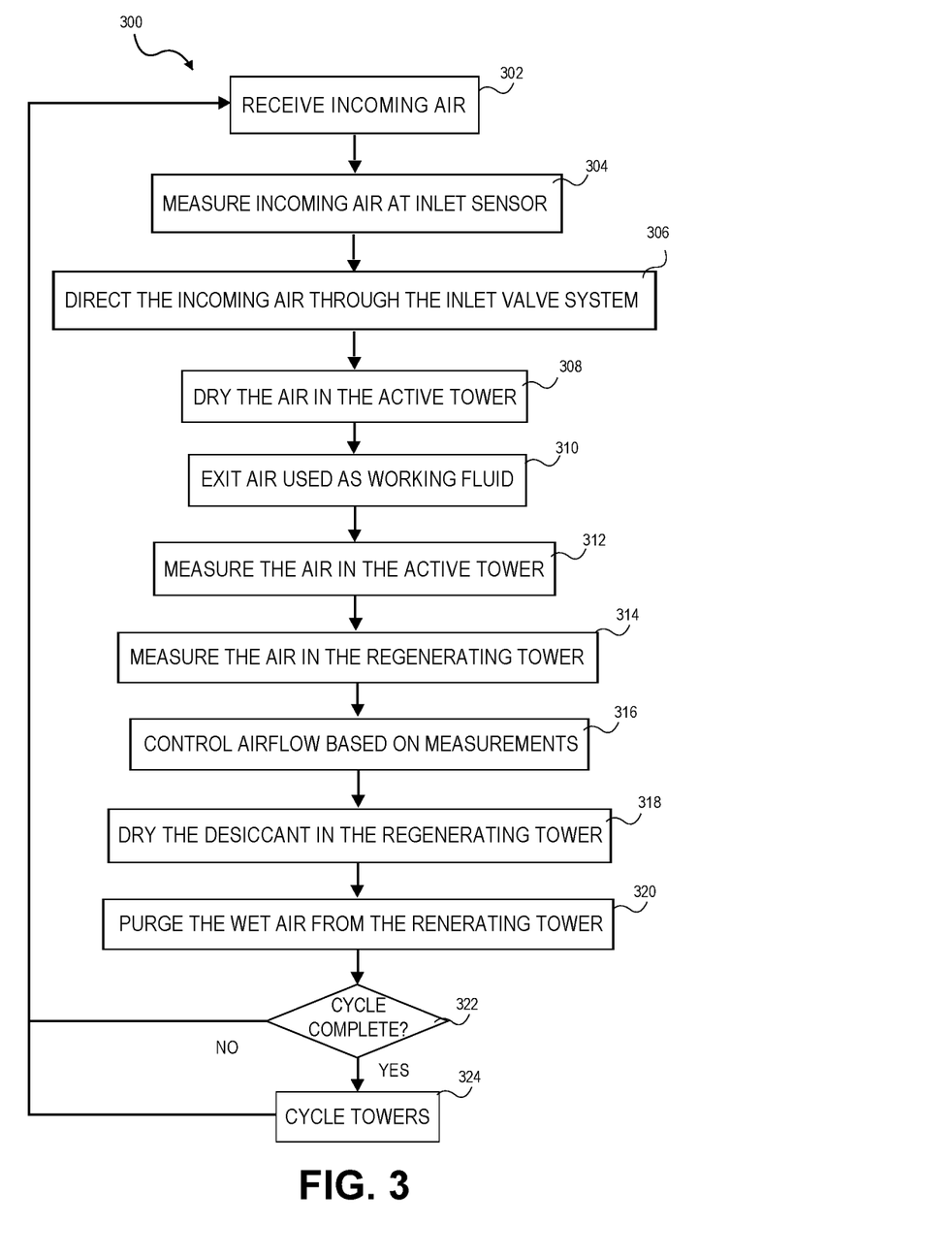
FIG. 3 presents an embodiment of a method for drying air in a pressure swing adsorption system.

Turning now to an exemplary method describing embodiments of the invention in FIG. 3, the pressure swing adsorption air drying system 100 of embodiments such as the air drying system 100 is described. At a Step 302, incoming air 106 is received into the air dryer system 100. The incoming air 106 may be from any source and used for any application that may require dry air. Typically, the incoming air 106 is compressed air and is received from an air compressor. Compressed air contains moisture that should be removed before the incoming air 106 received by working parts. Working parts may be damaged or worn from liquid water as described above.

At Step 304 the incoming air 106 is sensed by inlet sensor 110. The inlet sensor 110 may be multiple sensors and may sense multiple states of the incoming air 106. The inlet sensor 110 may measure temperature, pressure, moisture content, mass flow rate, or any other incoming air 106 state that may be useful for performing embodiments as described herein. The inlet sensor 110 output may be sent to the control unit 142 and/or to the adjustable purge mass flow controller 126 to control dry air 120 flow to the regenerating tower or any other valve as described in embodiments of the air drying system 100.

At Step 306, the incoming air is received in the inlet valve system 112. The inlet valve system 112, in some embodiments, directs air into the active tower 102 and out of the regenerating tower 104. In some embodiments, the inlet valve system 112 is a four-way two position valve or inlet/purge valve 114 and directs the incoming air 106 into the active tower 102 and directs the wet air 144 out of the regenerating tower 104 as described above. In some embodiments, the inlet valve system 112 comprises multiple valves such as the left valve 202, right valve 204, and inlet shuttle valve 206 for directing and controlling the airflow and the airflow rates as described in embodiments above.

At Step 308, the incoming air 106 enters the active tower 102. The active tower 102 may house active desiccant 118 that removes moisture from the incoming air 106 creating dry air 120. The active desiccant 118 may be silica gel, indicating silica gel, a molecular sieve, calcium oxide, calcium sulfate, or any other material that adsorbs moisture.

At Step 310, after exiting the active tower 102, the dry air 120 may pass through the shuttle valve 124 and be directed to work as the working fluid 122 in any number of applications as described above. The shuttle valve 124 may operate to direct the dry air 120 from the active tower 102 whether the active tower 102 is Tower A or Tower B. The shuttle valve 124 operation may be controlled by timer or by the the control unit 142.

At Step 312, at least one active tower sensor 138 may be included in the active tower 102. The active tower sensor 138 may measure the state of the air in the active tower 102 including temperature, pressure, humidity, mass flow rate, or any other state that may be useful in determining dewpoint or otherwise be useful in embodiments discussed herein. The active tower sensor 138 output may be received control unit 142 to controlling the valves and airflow as described above.

At Step 314, the air in the regenerating tower 104, is measured by the regenerating tower sensor 140. In some embodiments, the regenerating tower sensor 140 and the active tower sensor 138 are the same and are capable of taking the same measurements. The regenerating tower sensor 140 output may be received at the control unit 142 to control the valves and airflow as described above.

At Step 316, the adjustable purge mass flow controller 126 is controlled to regulate the dry air 120 into the regenerating tower 104. The control unit 142 may receive input from the inlet sensor 110, the control sensor 130, the active tower sensor 138, and the regenerating tower sensor 140. The control unit 142 may then control the adjustable purge mass flow controller 126, or any other valve described in embodiments herein, based on the sensor output. In some embodiments, the control unit 142 controls the dry air 120 flow rate into the regenerating tower 104 based on the calculated dewpoint inside the regenerating tower 104 calculated from measurements taken by the regenerative tower sensor 140 inside the regenerating tower 104. The dry air 120 may be fed into the regenerating tower 104 to lower the dewpoint of the air such that the air may help the regenerating desiccant 132 desorb any moisture thus recharging the regenerating desiccant 132 to cycle back to active mode.

At Step 318, the dry air 120 is directed into the regenerating tower 104 to aid in drying the regenerating desiccant 132. The pressure in the regenerating tower 104 may be reduced to enable lower the dewpoint of the air in the regenerating tower and a portion of the dry air 120 may be introduced into the regenerating tower 132 to further aid in drying the regenerating desiccant 132. The air exiting the regenerating tower 104 may be wet air 144 removing the moisture from the regenerating desiccant 132.

At Step 320, the wet air 144 enters the inlet valve system 112 and, in some embodiments, is directed to a purge valve, or exhaust valve, or the left valve 202 and the right valve 204 for removal from the air drying system 100. The purge valve, or exhaust valve, may be inlet/purge valve 114 and may be a pressure and release the wet air 144 when the pressure in the regenerating tower 104 reaches a threshold. The purge valve, or exhaust, may also be a solenoid valve and controlled using the control unit 142.

At Step 322, the measurements from the sensors or a timer determines when the cycle switches. The cycle may switch at the point where the sensors reach a specified threshold such as when the dry air 120 becomes wet or when the active sensor 138 measures a level of humidity or a specified dewpoint in the active tower 102, for example. In some embodiments, the switch may occur when the regenerating tower sensor 140 measures a humidity or dewpoint threshold in the regenerating tower 104. In some embodiments, the switch may be on a timer and the switch may occur based on a prescribed time or based on a combination of the time and the sensor readings.

In some embodiments, in Step 324 the cycle occurs when the regenerating desiccant 132 is recharged and the active desiccant 118 has adsorbed a predetermined amount of moisture, the cycle switches and the active tower 102 becomes the regenerating tower 104 and the regenerating tower 104 becomes the active tower 102. This occurs at a designated time or when the conditions, as described above, are detected by the sensors and the control unit 142 switches the valves to direct the airflow in the opposite direction leading the incoming air 106 into Tower B, the dry air 106 into Tower A, and the wet air 144 from Tower A.

In some embodiments, the steps described above may be rearranged, omitted, and new steps may be added. The order of the steps may be rearranged and in some embodiments changed. For example, in the method described, the measurements of the air occurs at intermittent steps, in reality the measurements and control of the airflow may be substantially continuous, or discreet measurements may be made every five seconds, one second, less than one second, or any intervening period. In some embodiments, the cyclical period may be set on a timer and the control only may be used to set a general airflow and no measurements may be made. In any case, any embodiment of the invention as described herein may be incorporated, added to, or omitted creating any combination of embodiments and methods.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pressure swing adsorption system of drying air comprising:
    a first tower containing a first desiccant and receiving an incoming airflow;
    wherein the first desiccant adsorbs moisture from the incoming airflow creating a reduced-moisture air;
    a second tower containing a second desiccant and receiving the reduced-moisture air from the first tower;
    a valve for regulating an amount of the reduced-moisture air flowing from the first tower to the second tower;
    at least one sensor for measuring a state of the air in the system; and
    a controller configured to control a variable orifice of the valve based at least in part on a dewpoint,
    wherein the dewpoint is determined from the state of the air in at least one of the first tower and the second tower.

2. The pressure swing adsorption system of claim 1, wherein the first desiccant and the second desiccant is at least one of a silica gel, indicating silica gel, a molecular sieve, calcium oxide, and calcium sulfate.

3. The pressure swing adsorption system of claim 1, wherein the state comprises at least one of a temperature, a pressure, a flow rate, and a humidity of the air.

4. The pressure swing adsorption system of claim 1, wherein the controller is a programmable logic controller.

5. The pressure swing adsorption system of claim 1, wherein the sensor is disposed in the second tower and an output of the sensor is used to calculate the dewpoint of the air in the second tower.

6. The pressure swing adsorption system of claim 5, wherein the controller controls a mass flow rate of the reduced moisture air from the first tower to the second tower.

7. The pressure swing adsorption system of claim 6, wherein the controller is further programmed based on a required outlet pressure for a working fluid.

8. The pressure swing adsorption system of claim 1, wherein the first desiccant is further configured to release moisture into the reduced-moisture air and the second desiccant is further configured to adsorb moisture from the incoming air.

9. The pressure swing adsorption system of claim 1, further comprising a four-way two position valve for directing the incoming airflow to the first tower and purging wet air from the second tower.

10. A pressure swing adsorption system of drying air comprising:
    a first tower containing a first desiccant and receiving an airflow;
    a second tower containing a second desiccant;
    wherein the first desiccant is configured to adsorb moisture from the airflow creating a reduced-moisture air;
    at least one sensor for sensing a state of the air in the system;
    a valve for regulating the reduced-moisture air from the first tower to the second tower,
    wherein the second tower receives at least a portion of the reduced-moisture air for regenerating the second desiccant; and
    a controller configured to control a variable orifice of the valve based at least in part on a dewpoint,
    wherein the dewpoint is determined from the state of the air in the second tower.

11. The system of claim 10, wherein the second desiccant adds moisture to the reduced-moisture air creating a wet air.

12. The system of claim 11, wherein the dewpoint of the airflow in the second tower is determined from the state of the air.

13. The system of claim 12, wherein the controller is a programmable logic controller.

14. The system of claim 13, wherein the airflow is received through a four-way two position valve for directing the airflow to the first tower and purging wet air from the second tower.

15. The system of claim 14, wherein the second desiccant is further configured to adsorb moisture from the airflow and the first desiccant is further configured to release moisture into the reduced-moisture air.

16. A pressure swing adsorption system of drying air, comprising:

incoming air received through an inlet valve, wherein the incoming air passes through a first desiccant disposed in a first tower, wherein the desiccant removes moisture from the incoming air creating dry air;

a first portion of the dry air that is passed to an outlet of the system to be used as a working fluid;

a second portion of the dry air that is passed to a second desiccant in a second tower through a variable orifice purge valve, wherein the variable orifice of the purge valve is controlled by a programmable logic controller, wherein the control of the variable orifice of the valve by the programmable logic controller is based at least in part on a dewpoint, wherein the dewpoint is measured in the second tower, wherein the dry air removes moisture from the second desiccant creating wet air; and a purge valve that removes wet air from the system.

17. The system of claim 16, further comprising:

a sensor disposed in the second tower, for measuring at least one state of the air in the second tower, wherein the determination of the dewpoint in the second tower is based at least in part on the at least one measured state of the air in the second tower.

18. The system of claim 17, wherein a second tower air pressure is lower than a first tower air pressure.

19. The system of claim 16, wherein the second desiccant is used to remove moisture from the incoming air and the first desiccant is used to release moisture into the dry air.

20. The system of claim 16, wherein the inlet valve comprises a shuttle valve for receiving the incoming air and a two-way solenoid valve for purging wet air from the second tower.

* * * * *

UNITED STATES PATENT AND TRADEMARK OFFICE
CERTIFICATE OF CORRECTION

PATENT NO. : 10,589,220 B1  
APPLICATION NO. : 16/263514  
DATED : March 17, 2020  
INVENTOR(S) : James Vincent DiMaiolo et al.

Page 1 of 1

It is certified that error appears in the above-identified patent and that said Letters Patent is hereby corrected as shown below:

On the Title Page

Item (72):
"Inventors: James Vincent DiMaiolo, Lafayette, CO (US); David K. Boger, Sonoma, CA (US)"

Should be changed to:
--Inventors: James Vincent DiMaiolo, Lafayette, CO (US)--

Signed and Sealed this
Tenth Day of November, 2020

Andrei Iancu
*Director of the United States Patent and Trademark Office*